Dec. 12, 1961  A. MOTTU ET AL  3,012,453
REPEATER DEVICE OF THE STOP POSITIONS OF A MOBILE MEMBER OF
A PRECISION MACHINE-TOOL OR OF A MEASURING MACHINE
Filed Feb. 21, 1958  5 Sheets-Sheet 1

ANDRE' MOTTU
ROBERT VIRET
By *Irwin S. Thompson*
ATTY.

INVENTORS
ANDRÉ MOTTU
ROBERT VIRET

BY
ATTORNEY

ANDRÉ MOTTU
ROBERT VIRET

ANDRÉ MOTTU
ROBERT VIRET

United States Patent Office 3,012,453
Patented Dec. 12, 1961

3,012,453
REPEATER DEVICE OF THE STOP POSITIONS OF A MOBILE MEMBER OF A PRECISION MACHINE-TOOL OR OF A MEASURING MACHINE
André Mottu and Robert Viret, Geneva, Switzerland, assignors to Societe Genevoise d'Instruments de Physique, Geneva, Switzerland, a corporation of Switzerland
Filed Feb. 21, 1958, Ser. No. 716,703
Claims priority, application Switzerland Sept. 13, 1957
1 Claim. (Cl. 77—4)

This application is a continuation-in-part of our copending earlier-filed application, Serial No. 692,811.

The present invention has as an object to provide a repeater device of the stop positions of a mobile member of a precision machine-tool or of a measuring machine.

The repeater devices of positions which are part of, for instance, the jig boring machines, boring machines, co-ordinate grinding machines, and other machine-tools of this kind comprise generally stops or marks which have to be fastened manually on a carrier in defined positions in order to repeatedly and automatically stop the mobile member of the machine-tool in desired positions. The exact setting into position of said stops or marks on their carrier is always a difficult and lengthy operations, and is frequently rendered very difficult to carry out correctly by reason of the lack of space and of the bad accessibility of said carrier. Consequently the setting into position of said stops or marks causes a significant idle time of the machine-tool when it is desired to machine a small series of identical parts.

The device which is an object of the present invention tends to remedy these drawbacks and is characterized by the fact that it comprises at least one rotative magnetic memory member, at least one generator of electric impulses coupled, on the one hand, to said memory member and, on the other hand, to said mobile member in such a manner that the phase of the generated impulses is a function of the position of the mobile member, at least one magnetic head located opposite the surface of said memory member and connected by the intermediary of a commutator successively to the generator of impulses in order to register onto said memory device the emitted impulses which constitute then the remembrance of determined positions of the mobile member, and to a phase comparator, which is itself connected to said impulse generator device, said phase comparator delivering a voltage, the value of which is a function of the phase difference between the impulses which are restituted by the memory device, and further a control apparatus responsive to the value of the voltage delivered by the phase comparator and which controls a driving device and in which said memory member is constituted by a rotative member, the surface of which is locally magnetizable, and by the fact that said magnetic head is located on a holder displaceable along guides parallel to the rotational axis of the memory member, i.e., the magnetic head is longitudinally adjustable.

The attached drawing shows schematically and by way of example a jig boring machine equipped with a position repeater device according to the invention.

Figure 1:
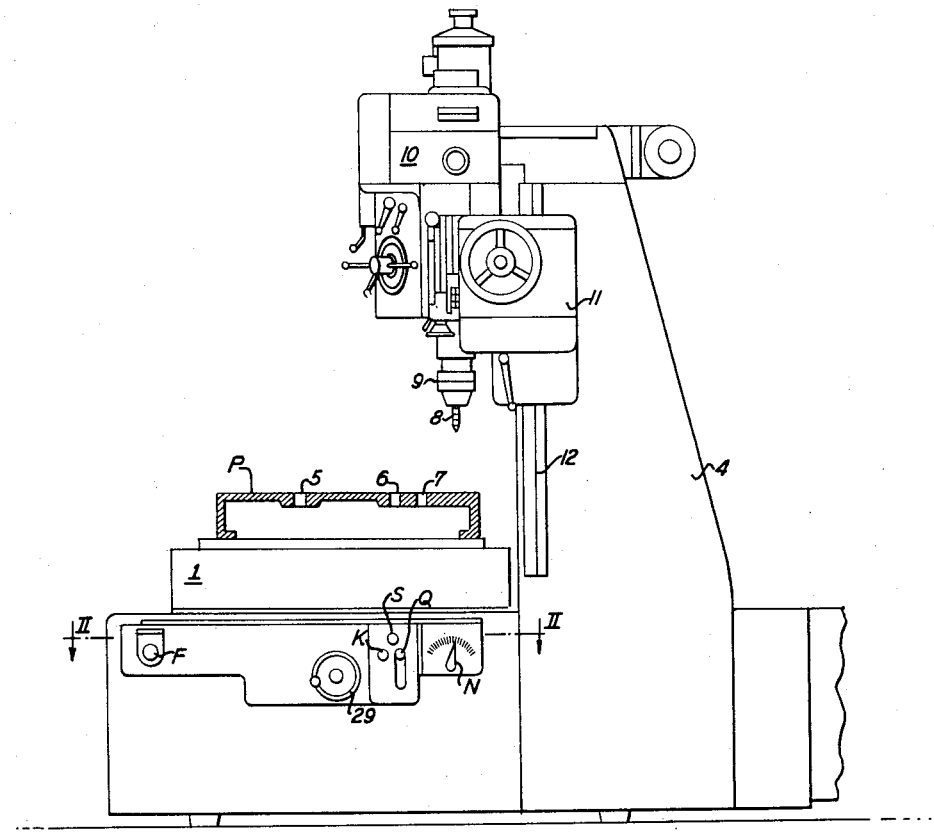
FIG. 1 is a side view of a jig boring machine provided with a system constructed in accordance with the present invention.

According to FIGS. 1 to 6 of the attached drawing, the jig boring machine illustrated comprises a table 1 sliding along slide-rails 2, 3 (FIG. 5) provided on a frame 4. The table 1 carries a workpiece P (FIG. 1) into which are to be machined drillings 5, 6, 7 by means of a drill 8, fastened to the extremity of a spindle 9. Said spindle is carried by a head 10 transversely movable with respect to the table 1 along a cross bar 11 and vertically movable along lateral slide-rails 12, carried by the frame 4.

The table 1 is driven by an electric motor $E_1$ (FIG. 2) controlled by a hand operating member 28 (FIG. 1). The setting of the table 1 in exact position is carried out manually by means of a hand-wheel 29 connected to a driving shaft 30 by the intermediary of a coupling 31 (FIG. 5), the two parts of which are normally kept clear one from the other by a spring 33. The driving shaft 30, connected to the shaft of the motor $E_1$ by means of a gear box V, carries a worm 34 mechanically connected to lead screw 35. Said lead screw is carried, on the one hand, by bearings provided in a protective casing 38 and, on the other hand, by a bearing 39 (FIG. 2) forming an axial stop and fastened to the frame 4. A nut 41 fastened to the table 1 and engaged onto said lead screw drives said table along its slide-rails 2, 3.

The jig boring machine illustrated is also equipped with a repeater system of predetermined positions of the table 1. Said position repeater system (FIG. 6) comprises:

(1) A repeater device.
(2) A control device CT, and
(3) A motor drive system coupled to repeater device RA via control device CT.

For clearness of the description, each of said devices will be described successively.

The repeater device comprises:

(a) A first rotative memory member M to register approximate stop positions of the table 1. Said memory member M, driven at a constant speed by a synchronous motor MS fed by an electric network R, is constituted by a drum 36 made of a non-ferromagnetic material covered with a layer 37 of a locally magnetizable ferromagnetic material;

(b) A current impulse generator device comprising:

(1) A three-phase alternator A, the rotor of which is rigidly fastened on the same shaft 54 as the rotative memory member M while its stator, connected by conductors 46 to a phase shifter ES, feeds said phase shifter's stator with three phases of alternating current;

(2) The phase shifter ES, constituted by a synchronous transmitter, the rotor of which, carried by a shaft 43, is connected by means of a speed reducer rv to a toothed rack 44 carried by the table 1. The reduction ratio is chosen in such a manner that when the table 1 is moved along its slide-rails from the one until the other of its two end positions, the shaft 43 performs an angular displacement which is at most equal to 180°;

(3) An electronic equipment AE for converting one form of current into another form of current is fed by a power supply not represented, and connected by conductors 48 to the phase shifter ES and which receives from said phase shifter a sinusoidal alternating current $ct$ the phase of which is a function of the positions of the table 1. Said electronic equipment emits in conductors 56 current impulses $it$ of very short duration, at each complete period of the feeding current $ct$. Said impulses $it$ are thus emitted at the frequency $f_1$ of the feeding current $ct$ and are in phase concordance with said current;

(c) Registering magnetic heads $TE_1$, $TE_2$ ... $TE_n$, the number of which is equal to the maximum number of the stop positions which the memory member M may register. Said magnetic heads are connected electrically successively to the electronic equipment AE by the intermediary of a selector SE and of a switch J. Each registering head comprises a magnetic circuit 49 carrying an excitation winding 50 and presenting an air-gap 51 located in the proximity of the surface of the memory member M;

(d) Reading magnetic heads $TL_1$, $TL_2$ ... $TL_n$, the number of which is equal to the registering heads and which are similar to said registering heads. Each reading head is located in a plane perpendicular to the revolving axis of the memory member M in which is located a registering head. At each passage of an area, magnetized by an impulse $it$ and representing the registering onto the memory member M of said impulse $it$ in front of the air-gap 51 of the reading head which is in service, said head emits, in the conductors 58, a current impulse $iM$;

(e) A phase comparator CP is connected, on the one hand, by means of conductors 55 permanently to conductors 56 connected to the electronic equipment AE and, on the other hand, successively to each of the reading heads by the intermediary of conductors 58 and of a selector SL. Said phase comparator CP delivers a sinusoidal alternating current $dM$ which controls an electronic amplifier RC fed by a power supply not represented. Said sinusoidal alternating current $dM$ presents an amplitude which is a function of the phase difference of the impulses $it$ and $iM$ feeding the phase comparator CP and which reduces to zero when the phase of the current impulses $it$ is shifted 180° with respect of the phase of the current impulses $iM$.

Said electronic amplifier RC is connected by conductors 57 to at least one relay 57 included as shown in the control device CT for the displacements of the table 1. Said relay controls the feeding of the motor $E_1$ which drives said table 1 by the intermediary of the gear box V.

Figure 2:
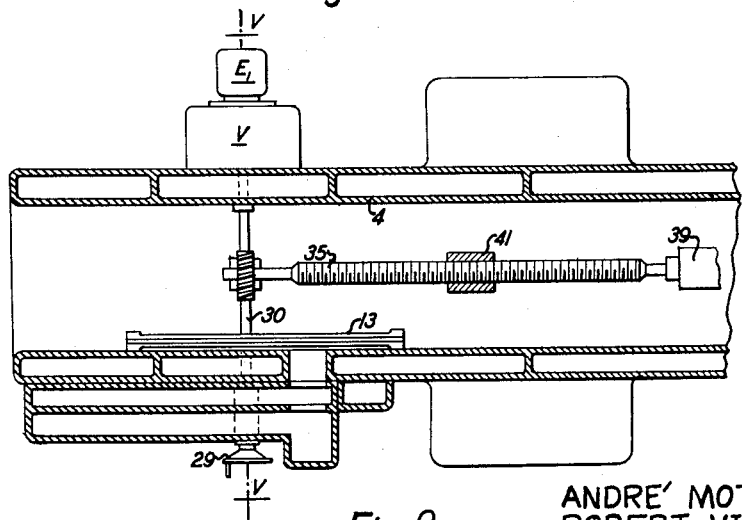
FIG. 2 is a horizontal cross section along line II—II of FIG. 1.
Figure 3:
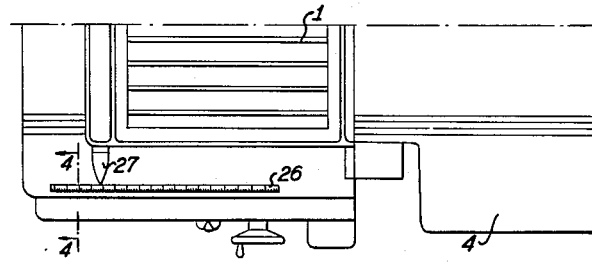
FIG. 3 is a partial plan view, of the end of the apparatus present in FIG. 1.
Figure 4:
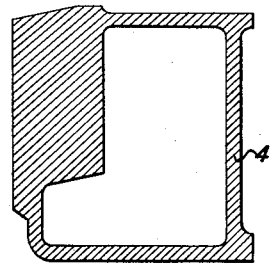
FIG. 4 is a magnetized vertical cross section taken along line IV—IV of FIG. 3.
Figure 5:
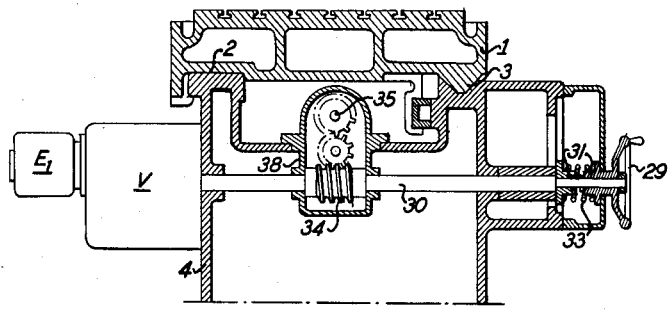
FIG. 5 is a vertical cross section along line V—V of FIG. 2.
Figure 6:
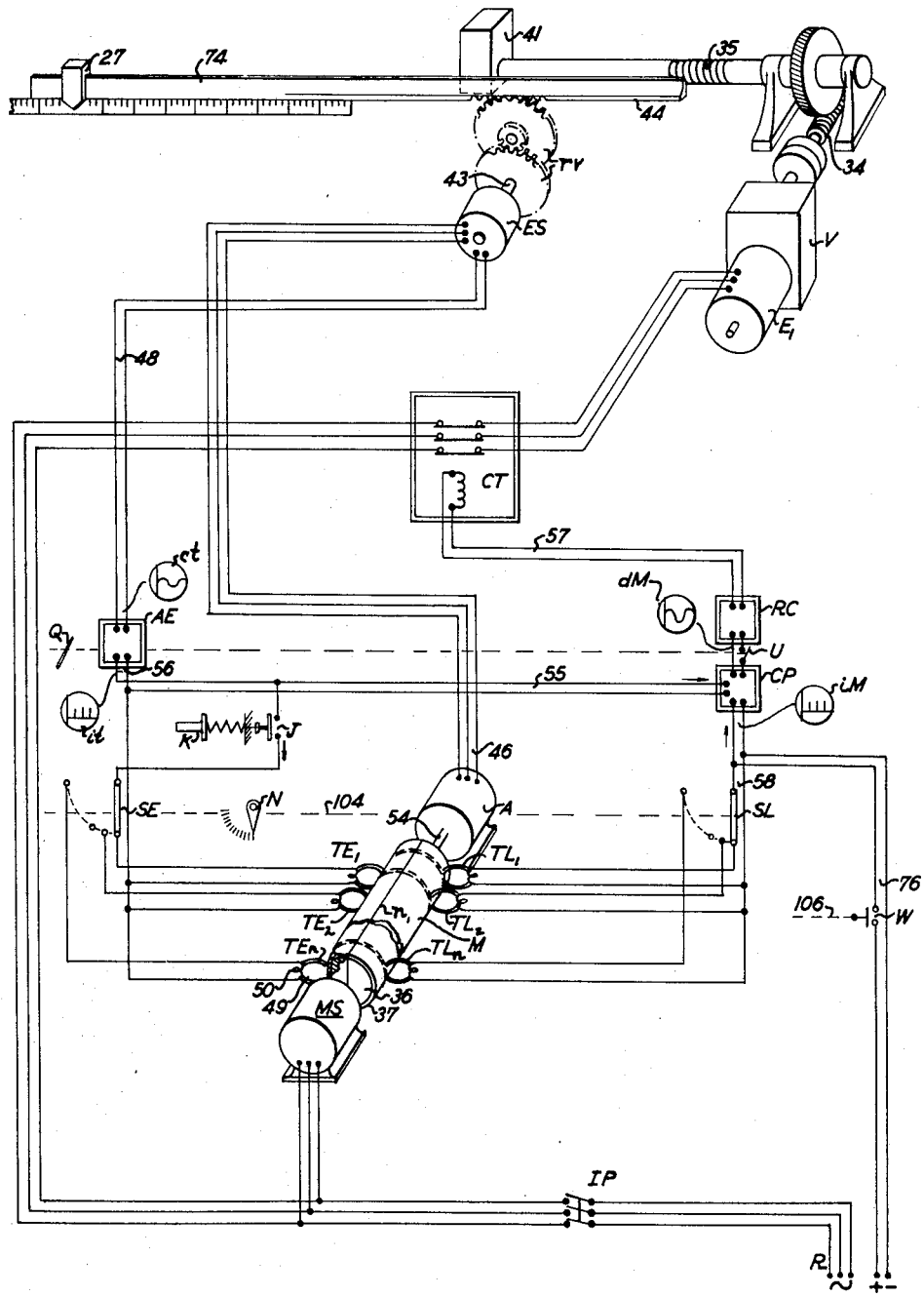
FIG. 6 is a diagram of the mechanical and electrical connections made in accordance with the present invention between the different system components and the jig boring machine components.
Figure 7:
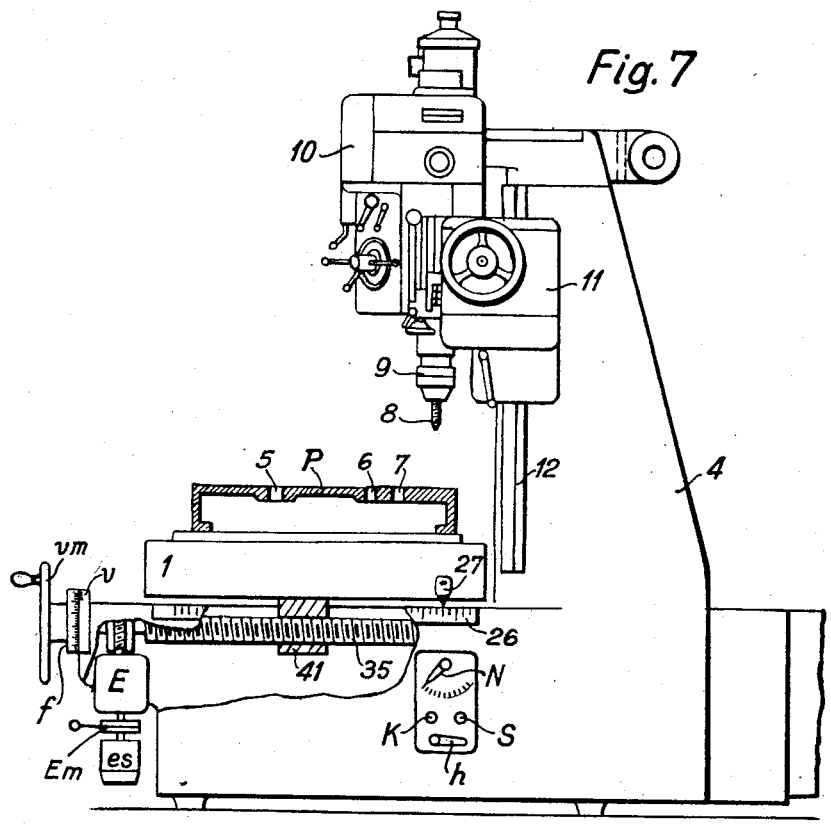
FIG. 7 is a side view with partial cross section of a machine-tool equipped only with a ruler to spot roughly the position of the moveable machine tool.

The operation of the described device is the following:

A first workpiece P is rigidly fastened on the table 1, then by actuating the operating member 28 (FIG. 1) in one direction or the other, the operator causes the energization of the motor $E_1$. Said motor drives the table 1 at high speed along its slide-rails by the intermediary of the gear box V and of the worm 34 which drives the lead screw 35 on which is engaged the nut 41 fastened to the table 1 (FIGS. 2, 5 and 6). During said displacement at high speed, the operator observes the auxiliary ruler 26 (FIG. 3) carried by the frame 4 in front of which moves the mark 27, said mark being carried by the table 1. He stops the table in a desired position.

This operation corresponds to the operations which are necessary for the setting in position of the table of a jig boring machine of known kind, and the recording of a repeat position. In order to carry out said recording, the operator proceeds in the following manner:

(1) He closes a main switch IP in order to supply voltage to the synchronous motor MS. From then on the memory member M is driven in rotation at a constant speed.

(2) He actuates the member N in order to set the selectors SE and SL (FIG. 6) in the same angular position corresponding, for instance, to the right-hand end contact. In order to facilitate said operation, these four selectors are connected one to the others and to the control member N (FIG. 1) by means of a linkage or by means of an electromagnetic connection schematically illustrated in FIG. 6 through the dashes 104. Through only one operation, the operator selects the registering heads of the repeater devices RA and RM, the order number of which corresponds to that of the stop position which should be registered.

(3) He actuates control member K connected electromagnetically or by a linkage to the switch J.

The closing of the switch J causes the excitation of the winding 50 of one of the registering heads $TE_1$, $TE_2$ ... $TE_n$ which is in service through the current impulses $it$ and therefore causes the magnetic registering onto said memory member M of said current impulses $it$.

Now the rate of these current impulses is given by the alternator A, the rotor of which is rigidly fastened on the same shaft as the memory member M, the magnetized area, created on the surface of said memory member by the passage of said impulses in the registering head, comes always on the same place of the surface of the memory member. The angular position of the generatrix of the memory member M, on which are registering said current impulses $it$ with respect to a generatrix $n_1$ taken as an origin, is a function of the angular position of the shaft 43 of the phase shifter ES, since the phase of the current $ct$, issuing from said phase shifter, is a function of the angular position of its shaft 43 which is in turn a function of the position of the table 1 along its slide-rails 2 and 3. The magnetic registering of said current impulses $it$ constitutes then the remembrance of said position of the table 1.

Said first stop position of the table 1 being registered, the operator actuates from one step the control member N in order to set in service the registering head for the registering of the second position.

The operator proceeds in the same way for each desired stop position of the table 1 and when all these positions are registered, said positions may be repeated by the operator in the following manner:

(1) He sets the control member N of the selectors SE, SL, in the position carrying the order number of the desired stop position of the table 1.

(2) He closes the main switch IP that causes the energization of the synchronous motor MS.

(3) He actuates a repetition control member Q connected by a linkage or by an electromagnetic connection—schematically illustrated in FIG. 6 by the line 53—to switch U connected in the electric connections connecting the phase comparator CP to the amplifier RC. The actuating of said member Q causes the establishment of said electric connections and thus the energization of the amplifier RC controlled by said phase comparator CP.

At each passage of a magnetized area of the memory member M in front of the air-gap of the reading head which is in service, a current impulse $iM$ is emitted in the conductors 58. The phase comparator CP receives consequently, on the one hand, the current impulses $iM$, generated by the registering of the exact position of the micrometer corresponding to the desired stop position of the table 1 and, on the other hand, the current impulses $it$ issuing from the impulse generator A, ES, AE, the phase of which corresponds at every moment to the instantaneous position of the table 1. Consequently, if the phase of the current impulses $it$ does not correspond to the phase of the current impulses $iM$, said phase comparator CP delivers on the one hand, a voltage $dM$ called "error voltage," the amplitude of which is a function of the phase difference between the current impulses $it$, $iM$. Said error voltage $dM$ reduces to zero when the phase of the current impulses *it* is displaced 180° with respect to the phase of the current impulses *iM*.

The phase comparator CP receives thus the current impulses *iM*, the phase of which corresponds to the approximate desired stop position and the current impulses *it*, the phase of which corresponds, at every moment, to the position of the table 1 along its slide-rails. Consequently when the operator operates the operating member 28 in the sense of the desired displacement of the table 1, the control device CT causes the energization of the motor $E_1$ and the displacement of the table 1. In proportion, as the table approaches its stop position, the phase difference between the impulses *it* and *iM* decreases and when said difference reaches a predetermined fixed value corresponding to the instantaneous position of the table and the desired position for said table, the control device CT controlled by the amplifier RC causes the breaking of the circuit of the motor $E_1$.

When a workpiece comprising a certain number of machining operations which have been already machined by the machine and the positions of said machining operations have been registered into the memory device, two cases may exist:

(1) An unmachined workpiece is fastened on the machine and said machine repeats the machining operations into the positions registered by the memory device.

(2) A workpiece on which some machining operations have already been carried out in well determined positions, is fastened on the machine and the memory device must move the workpiece under the tool over distances which must be not only exact between the positions given by the memory device but also with respect to the positions previously machined.

One proceeds then as follows:

Knowing the position of a reference machining on the workpiece, the table is brought into said position and the workpiece is moved with respect to the table on which said workpiece is to be fastened until a centering tool, taking the place of the working tool, shows that the reference machining is in the exact position which said machining would have had if it had been machined on the machine. That is what is called the centering of a workpiece. Said workpiece being generally very heavy and difficult to move, it is difficult to set said workpiece with respect to the table with the same exactness that it is possible to move the members of the machine fitted with adequate sliding devices, adjusting devices and locking devices.

It is therefore easier to make only a rough centering of the workpiece with respect to the working table on which said workpiece is set and to move the measuring members and the memory members in order to realize again the desired exact correspondences between the already machined surfaces and the surfaces which remain to machine.

In order to carry out said centering, the operator after having fastened a new workpiece on the table, carries out the following operations:

(1) He repeats the position of the reference machining which also has been registered into the memory device during the machining of the first workpiece.

(2) He moves manually the table 1 until the reference machining comes into the correct position.

(3) By the help of an adjusting member 32, he moves then the toothed rack 44 in the opposite direction. To this effect, said toothed rack 44 is mounted on slides 74. By said operation, the operator brings back the shaft 43 of the phase shifter ES into the position which it occupied previously after the repetition of the reference position.

From then on the workpiece P is in its correct position with reference to the memory member M as well as with respect to the measuring members of the machine, so that the operator may proceed with the machining of said workpiece.

When the operator has finished the machining of a series of identical workpieces, he erases the magnetic areas representing the registerings on the memory member M of the different stop positions of the table 1. In order to erase said magnetic areas, he closes the main switch IP and actuates a control member 106, connected to switch W inserted in conductor 76, connecting the reading heads $TL_1$, $TL_2$ . . . $TL_n$ to a source of direct current. The direct current flowing through the excitation windings 50 is of a sufficient value to magnetize each registering track *p* in the sense opposite of the magnetization of the magnetized areas representing the registerings of the current impulses *it*. Each track *p* of the memory member M is then magnetized in a homogeneous manner over its whole length and may no more induce current impulses into the reading heads.

Figure 8:
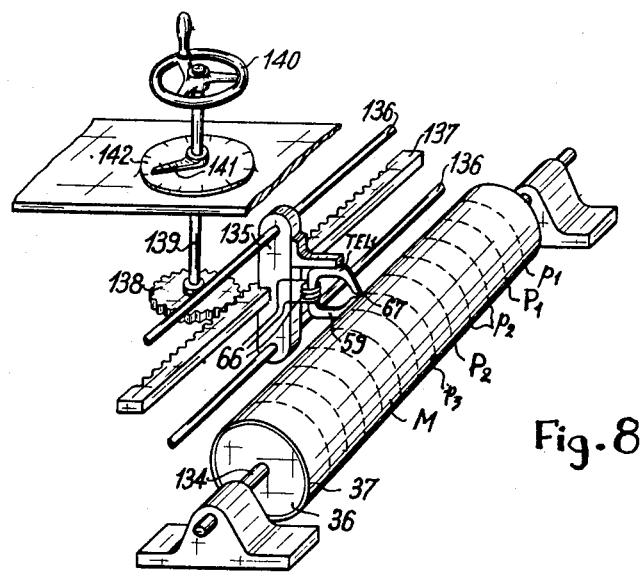
FIG. 8 is a perspective view of the rotative memory member used in the system of the invention and of the improvement provided hereby, namely a single longitudinally adjustable magnetic head cooperating with the memory member.

FIG. 8 presents, as suggested above, an improvement in the memory system, namely equipping the same with mobile magnetic head means.

The memory member M, driven at a constant speed by a motor shaft 134, is constituted by a cylinder 36, made of a non-ferromagnetic material covered with a film 37 of a ferromagnetic material locally magnetizable. A magnetic registering and reading head $TEL_1$ is carried by a holder 135 sliding along fixed guides 136, parallel to the axis of rotation of the cylinder 36. This head $TEL_1$ comprises a magnetic circuit 59 carrying a winding 66 and presenting an air-gap 67 located opposite the surface of the memory member, and in a transverse plane through the cylinder 36.

The holder 135 carries a toothed rack 137 meshing with a toothed wheel 138 fixed to a shaft 139 revolving in bearings not represented, and which carries a hand operating wheel 140 and an index 141 which rotates over a dial-plate 142.

The operation of this described improved device is as follows:

At the time of the registering of the stop positions of the mobile member of the machine-tool, the magnetic registering and reading head $TEL_1$ is connected as described above in order to allow the registering of the said stop positions of the mobile member. This magnetic head is displaced with the help of the hand operating wheel 140 one step after the registering of each position of machining. This magnetic head is thus successively brought opposite respective registering tracks $P_1$, $P_2$ . . . $P_n$ on each of which is respectively recorded a stop position of the mobile member of the machine-tool.

At the time of the repetition, the magnetic head is connected as described above in order to allow the reading of the magnetic zones printed on the surface of the memory member, at the time of the registering, and to control the stopping of this mobile member in the position of machining. After each stopping of the mobile member in a machining position registered in the memory member, the operator actuates the hand operating wheel 140 in order to move the longitudinally adjustable head forward one step.

From the foregoing detailed description, it should be apparent that the invention provides a control device for governing repeating positions of a movable member, such as table 1, of a machine tool. The system includes a memory device including at least one magnetic memory member M, alternator means A coupled to and driven in synchronism with the memory member M for generating a sinusoidal alternating current, and means ES connected to the movable member, table 1, and to the alternator A for generating a sinusoidal current having a phase angle that is a function of the position of the movable member or table 1. The system further includes means (AE) for converting the sinusoidal current leaving ES into a pulsating wave form current, magnetic head means located opposite the surface of the memory member M, and phase comparator means (CP) connected to the current converting means (AE). The magnetic head means preferably includes, as shown in FIG. 8, a longitudinally adjustable head supported for reciprocatory movement parallel to the longitudinal axis of the memory member M. Switching means SE and SL are provided for alternately connecting the magnetic head means to the current converting means AE to record on the memory member M the pulses emitted by the current converting means AE, and to the phase comparator means CP for supplying to said phase comparator means pulses recorded on the memory member M. The phase comparator means comprises means for delivering an error voltage, the value of which is a function of the phase difference between the pulses supplied thereto by the current converting means (AE) and the pulses which are received from the memory member M by the intermediary of the magnetic means. Control objects set forth at the outset of this specification have been sucessfully achieved. Various modifications can be made to the basic system without departing from the scope and spirit of the invention, as will be understood by those skilled in the art.

Accordingly, we claim:

In a control device for governing repeating positions of a movable member of a machine tool, the combination of a memory device comprising at least one rotative magnetic memory member, alternator means coupled to and driven in synchronization with said memory member for generating a sinusoidal alternating current, means connected to said movable member and to said alternator means for generating a sinusoidal current having a phase angle that is a function of the position of the movable member, means for converting said sinusoidal current into a pulsating wave form current, magnetic head means located opposite the surface of said memory member, said magnetic head means including at least one magnetic head, and means for supporting said head for movement longitudinally of said memory member; phase comparator means connected to said current converting means; switching means for alternatively connecting said magnetic head means to said current converting means to record on said memory member said pulses emitted by said current converting means, and to said phase comparator means for supplying to said phase comparator means pulses recorded on said memory member; said phase comparator means comprising means for delivering error voltage, the value of which is a function of the phase difference between the pulses supplied thereto by the current converting means and the pulses which are received from the memory member by the intermediary of said magnetic head means; control means connected to said phase comparator means and responsive to said error voltage; and a driving device operatively connected to said movable member and to said control means for control thereby.

References Cited in the file of this patent

UNITED STATES PATENTS

| | | |
|---|---|---|
| 2,475,245 | Leaver | July 5, 1949 |
| 2,537,770 | Livingston | Jan. 9, 1951 |
| 2,561,346 | De Vlieg et al. | July 24, 1951 |
| 2,722,853 | Knosp et al. | Nov. 8, 1955 |
| 2,736,852 | Nelson | Feb. 28, 1956 |
| 2,848,921 | Koulikovitch | Aug. 26, 1958 |
| 2,852,976 | Hoffman | Sept. 23, 1958 |